United States Patent
Ito et al.

(10) Patent No.: US 7,302,847 B2
(45) Date of Patent: Dec. 4, 2007

(54) PHYSICAL QUANTITY SENSOR HAVING MOVABLE PORTION

(75) Inventors: Takeshi Ito, Okazaki (JP); Minoru Murata, Okazaki (JP)

(73) Assignees: Nippon Soken, Inc., Nishio (JP); DENSO CORPORATION, Kariya (JP)

( * ) Notice: Subject to any disclaimer, the term of this patent is extended or adjusted under 35 U.S.C. 154(b) by 97 days.

(21) Appl. No.: 11/201,271

(22) Filed: Aug. 11, 2005

(65) Prior Publication Data
US 2006/0055096 A1    Mar. 16, 2006

(30) Foreign Application Priority Data
Aug. 17, 2004  (JP)  ............... 2004-237229
Aug. 17, 2004  (JP)  ............... 2004-237230

(51) Int. Cl.
*G01P 9/04*  (2006.01)
(52) U.S. Cl. .................. 73/504.14; 73/504.12
(58) Field of Classification Search ............. 73/504.12, 73/504.14
See application file for complete search history.

(56) References Cited

U.S. PATENT DOCUMENTS

| | | | |
|---|---|---|---|
| 4,574,327 A | 3/1986 | Wilner | |
| 5,728,936 A * | 3/1998 | Lutz | 73/504.12 |
| 6,450,029 B1 | 9/2002 | Sakai et al. | |
| 6,450,033 B1 | 9/2002 | Ito et al. | |
| 6,502,462 B2 | 1/2003 | Sakai | |
| 6,796,178 B2 * | 9/2004 | Jeong et al. | 73/504.12 |
| 7,004,029 B2 * | 2/2006 | Sakai | 73/504.12 |

FOREIGN PATENT DOCUMENTS

JP    A-2001-133268    5/2001

OTHER PUBLICATIONS

Office Action from German Patent Office issued on Dec. 20, 2006 for the corresponding German patent application No. 10 2005 038 914.7-52 ( a copy and English translation thereof).

* cited by examiner

*Primary Examiner*—John E. Chapman
(74) *Attorney, Agent, or Firm*—Posz Law Group, PLC (57) ABSTRACT

An angular rate sensor includes: a support substrate; a semiconductor layer; and a movable portion. The movable portion includes a driving vibration portion and a detecting vibration portion. The driving vibration portion is capable of vibrating in a first direction. The detecting vibration portion is capable of vibrating in a second direction. The driving vibration portion includes through holes, and the detecting vibration portion includes thorough holes. Each through hole of the driving vibration portion has an elongated shape extending in the first direction. Each through hole of the detecting vibration portion has an elongated shape extending in the second direction.

12 Claims, 3 Drawing Sheets

PHYSICAL QUANTITY SENSOR HAVING MOVABLE PORTION

CROSS REFERENCE TO RELATED APPLICATIONS

This application is based on Japanese Patent Applications No. 2004-237230 filed on Aug. 17, 2004, and No. 2004-237229 filed on Aug. 17, 2004, the disclosures of which are incorporated herein by references.

FIELD OF THE INVENTION

The present invention relates to a physical quantity sensor having a movable portion.

BACKGROUND OF THE INVENTION

One type of a physical quantity sensor is an angular rate sensor. As this sort of angular rate sensors, there are angular rate sensors generally manufactured by employing semiconductor substrates. In the general-purpose angular rate sensors, such a sensor is proposed in which a movable unit is constituted by a drive-purpose vibration unit which is vibrated along a first direction, and a detection-purpose vibration unit which is vibrated along a second direction perpendicular to the first direction by Coriolis force. Here, the Coriolis force is generated by applying an angular velocity to the sensor, when the drive-purpose vibration unit is vibrated along the first direction. For example, it is disclosed in Japanese Patent Application Publication No. 2001-91265, which corresponds to U.S. Pat. No. 6,450,033.

In such an angular rate sensor, the movable unit is formed so as to be released from a supporting substrate by etching a semiconductor layer supported by the supporting substrate. For instance, there is proposed an angular rate sensor employing an SOI (silicon-on insulator) substrate made by adhering both silicon substrates via an oxide film to each other. For example, it is disclosed in Japanese Patent Application Publication NO. 2001-133268.

The angular rate sensor corresponds to a front surface processed type angular rate sensor. In this sensor, while one of the silicon substrates for constructing the SOI substrate is employed as a supporting substrate, the movable portion is formed on the other silicon substrate by executing a well-known micro-machine processing technique such as a trench etching process and a sacrificial layer etching process with respect to both the other silicon substrate and the oxide film from the front surface side of the other silicon substrate.

Also, in the front surface processed type angular rate sensor (e.g., yaw rate sensor), in order to perform the etching process in a high efficiency and to reduce the movable unit in weight, a plurality of through holes is formed in a large area portion in such as an etching remaining portion of the movable unit. For example, it is disclosed in Japanese Patent Application Publication No. 2001-99861, which corresponds to U.S. Pat. No. 6,450,029.

On the other hand, in the angular rate sensor having such a movable unit, the movable unit released on the supporting substrate is displaced within, for example, the horizontal plane along the layer plane of the semiconductor layer which constitutes the movable unit.

In particular, while the movable unit is constituted by both the drive-purpose vibration unit and the detection-purpose vibration unit, the drive-purpose vibration unit is vibrated along the first direction by drive means, or the like, whereas the detection-purpose vibration unit is vibrated along the second direction perpendicular to the first direction by applying thereto the angular velocity when this drive-purpose vibration unit is vibrated along the first direction.

In the angular rate sensor having both the drive-purpose vibration unit and the detection-purpose vibration unit as the variable unit, plural through holes are formed so as to penetrate through the movable unit along the thickness direction of the semiconductor layer in order to improve efficiency of the etching process and to reduce the movable unit in weight.

However, in the conventional angular rate sensor, since the patterns of these through holes are provided by considering only the uniformity of the etching, the patterns of the through holes to be formed are same in both the drive-purpose vibration unit and the detection-purpose vibration unit.

Figure 4A:
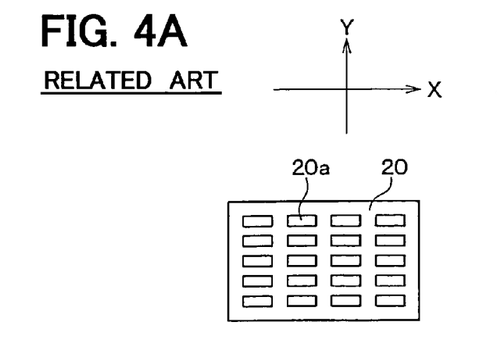
FIG. 4A is a partially enlarged plan view showing a drive purpose vibration unit of an angular rate sensor according to a related art.
Figure 4B:
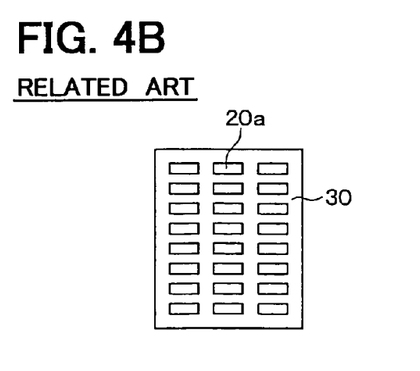
FIG. 4B is a partially enlarged plan view showing a detection purpose vibration unit of the sensor according to the related art.

As a typical pattern of through holes in a related art, as indicated in FIGS. 4A and 4B, such arrayed patterns are employed in both a drive-purpose vibration unit 20 and a detection-purpose vibration unit 30, in which longitudinal directions of through holes 20a having rectangular shapes are aligned with each other along the same direction.

In the case that the arrayed pattern of the through holes 20a formed in the drive-purpose vibration unit 20 are identical to those formed in the detection-purpose vibration unit 30, attenuation of vibrations, namely damping of vibrations is produced due to an influence of eddies of air generated in opening edge portions of the through holes 20a while the vibration unit is vibrated, depending upon a vibration direction of the vibration unit.

For instance, in the through hole patterns shown in FIGS. 4A and 4B, the drive-purpose vibration unit 20 is vibrated along an x direction as a first direction, whereas the detection-purpose vibration unit 30 is vibrated along a Y direction as a second direction. As to the arrayed pattern of the through holes 20a, when the detection-purpose vibration unit 30 is vibrated along the Y direction, the influence of the damping is increased.

If the damping happens to occur in both the vibration units, then losses of vibration energy are produced due to this damping. Accordingly, there is a risk that the vibrations become unstable. It is apparent that this risk may give an adverse influence to the sensor characteristic.

In order to avoid the damping caused by the air resistance, and the like, the conventional angular rate sensors are maintained under vacuum condition. To this end, the entire structure of a conventional angular rate sensor is sealed by a vacuum package. However, this structure may increase the manufacturing cost of the conventional angular rate sensors, which is not desirable.

Further, conventionally, a mechanical quantity sensor is constituted by a supporting substrate, a movable unit, and a peripheral fixing unit. The movable unit is supported on the supporting substrate under such a condition that the movable unit is separated from the supporting substrate to be arranged. The peripheral fixing unit is arranged at a peripheral portion of the movable unit on the supporting substrate, and is fixed to the supporting substrate so as to be supported.

In this mechanical quantity sensor, when a mechanical quantity is applied to this sensor, the movable unit can be displaced along the horizontal direction with respect to the plane of the supporting substrate. Then, this mechanical quantity sensor detects the applied mechanical quantity based upon the displacement state of the movable unit when the mechanical quantity is applied thereto.

As such a mechanical quantity sensor, for instance, an angular rate sensor which is formed by processing a semiconductor substrate is proposed. For example, it is disclosed in Japanese Patent Application Publication No. 2001-133268, In such a mechanical quantity sensor, when this sensor is operated, a constant potential is applied to the movable unit and an AC voltage is applied to a driving electrode which is provided opposite to the movable unit so as to displace the movable unit. In other words, the movable unit is driven by utilizing electrostatic attracting force in the conventional mechanical quantity sensor.

In the mechanical quantity sensor, the supporting substrate separately arranged under the movable unit is brought into the GND state when the sensor is operated. As a result, when the mechanical quantity sensor is operated, a large potential difference is produced between the movable unit and the supporting substrate. Therefore, there is a high possibility that the movable unit may be adhered to the supporting substrate due to the electrostatic attracting force, namely, a so-called "sticking" phenomenon may occur.

SUMMARY OF THE INVENTION

In view of the above-described problem, it is an object of the present invention to provide an angular rate sensor. The sensor provides stable vibration for detecting angular velocity with high accuracy.

An angular rate sensor includes: a support substrate; a semiconductor layer supported on the support substrate; and a movable portion disposed in the semiconductor layer. The movable portion is movably supported on the support substrate. The movable portion includes a driving vibration portion and a detecting vibration portion. The driving vibration portion is capable of vibrating in a first direction. The detecting vibration portion is capable of being vibrated in a second direction by angular velocity applied to, the sensor. The second direction is perpendicular to the first direction. The driving vibration portion includes a plurality of through holes, which penetrate in a thickness direction of the semiconductor layer. The detecting vibration portion includes a plurality of through holes, which penetrate in the thickness direction of the semiconductor layer. Each through hole of the driving vibration portion has an elongated shape extending in the first direction. Each through hole of the detecting vibration portion has an elongated shape extending in the second direction.

In the sensor, the elongated shape of the through holes of each of the driving vibration portion and the detecting vibration portion extends along with the vibrating direction, respectively. Therefore, the air resistance in those directions is reduced when the portion is vibrated. Thus, the damping of each of the driving vibration portion and the detecting vibration portion is reduced so that the vibration of each of the driving vibration portion and the detecting vibration portion can be stabilized. Accordingly, the sensor detects angular velocity with high accuracy.

Preferably, the detecting vibration portion is connected to the support substrate through a detection beam, which is movable in the second direction, and the driving vibration portion is connected to the detecting vibration portion through a driving beam, which is movable in the first direction.

Preferably, the through holes of the driving vibration portion provide a brick pattern, and the through holes of the detecting vibration portion provide a brick pattern. More preferably, the through holes of the driving vibration portion provide a plurality of lines, each of which is alternately aligned, and the through holes of the detecting vibration portion provide a plurality of lines, each of which is alternately aligned.

Preferably, each through hole of the driving vibration portion has a rectangular shape, a wide side of which is parallel to the first direction, and each through hole of the detecting vibration portion has a rectangular shape, a wide side of which is parallel to the second direction.

Further, a physical quantity sensor includes: a support substrate; a movable portion supported on the support substrate in such a manner that the movable portion is movable in a horizontal direction of the substrate when physical quantity is applied to the sensor; and a periphery frame portion disposed around the movable portion and fixed on the support substrate. The physical quantity is detected on the basis of a displacement of the movable portion when the physical quantity is applied to the sensor, and the periphery frame portion has a maximum electric potential when the sensor works.

In the sensor, since the periphery frame portion has the maximum electric potential, this potential is applied from the periphery frame portion to the support substrate. Accordingly, the potential of the support substrate becomes higher, compared with a conventional sensor. Specifically, the potential of the support substrate is higher than the ground state. Thus, the potential difference between the movable portion and the support substrate becomes smaller so that sticking effect between the movable portion and the support substrate is suppressed.

Preferably, the sensor further includes: a semiconductor layer supported on the support substrate. The movable portion and the periphery frame portion are provided by the semiconductor layer. The movable portion includes a driving vibration portion and a detecting vibration portion. The driving vibration portion is capable of vibrating in a first direction. The detecting vibration portion is capable of being vibrated in a second direction by the physical quantity applied to the sensor. The second direction is perpendicular to the first direction. The driving vibration portion includes a plurality of through holes, which penetrate in a thickness direction of the semiconductor layer. The detecting vibration portion includes a plurality of through holes, which penetrate in the thickness direction of the semiconductor layer. Each through hole of the driving vibration portion has an elongated shape extending in the first direction, and each through hole of the detecting vibration portion has an elongated shape extending in the second direction.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
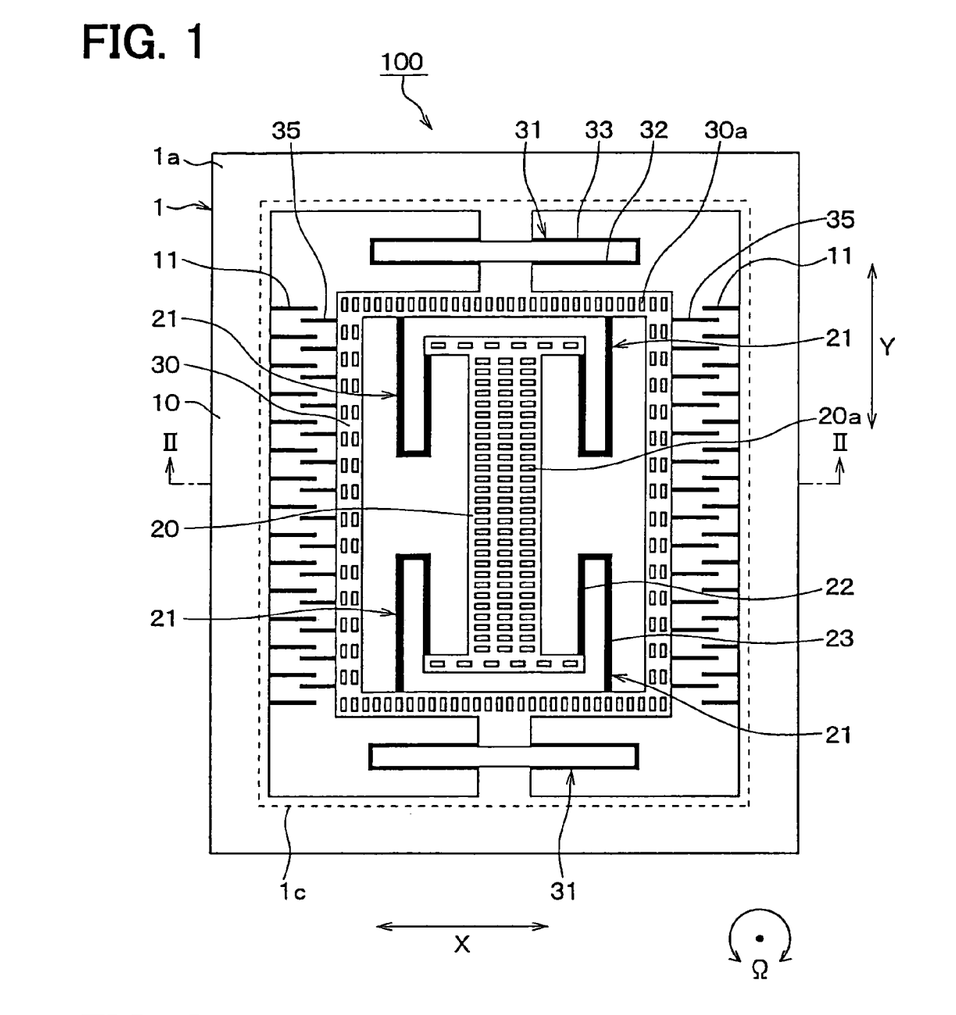
FIG. 1 is a plan view showing an angular rate sensor according to a first embodiment of the present invention.
Figure 2:
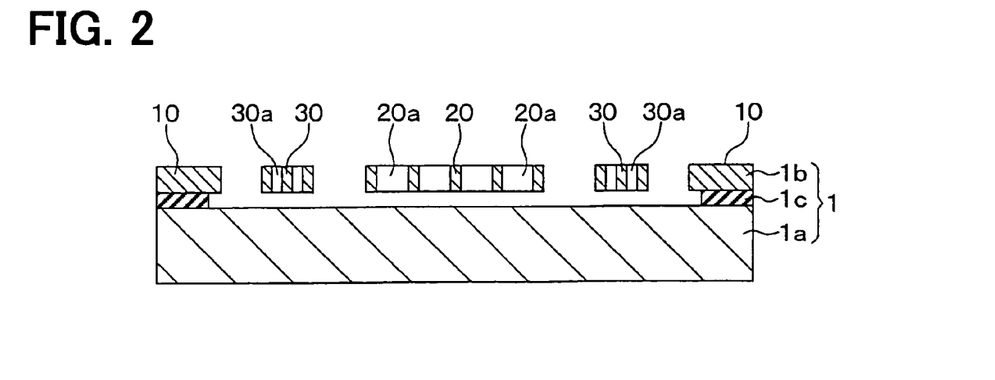
FIG. 2 is a cross sectional view showing the sensor taken along line II-II in FIG. 1.

FIG. 1 is a diagram for schematically representing a plane structure of an angular rate sensor 100 according to a first embodiment mode of the present invention. FIG. 2 is a sectional view for schematically showing the angular rate sensor 100, taken along a dot and dash line II-II shown in FIG. 1.

Figure 3A:
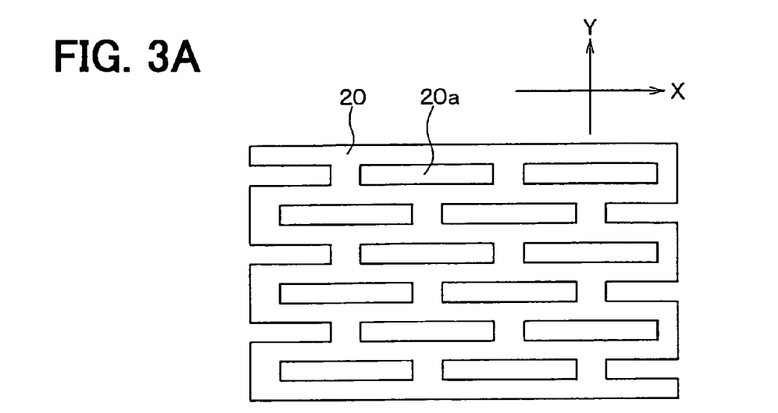
FIG. 3A is a partially enlarged plan view showing a drive purpose vibration unit of the sensor according to the first embodiment.
Figure 3B:
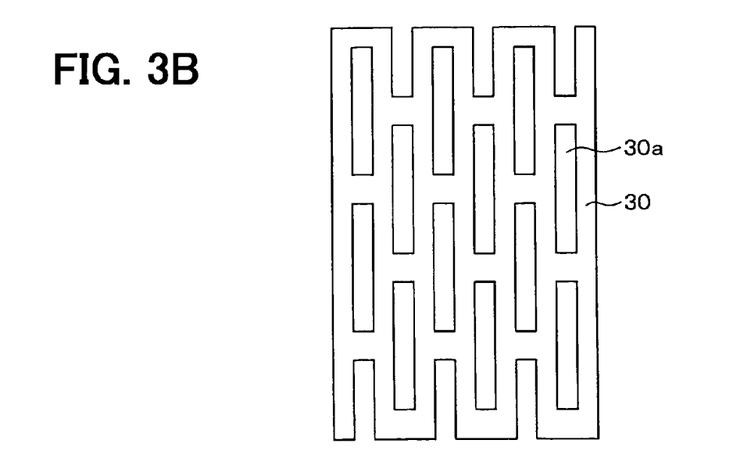
FIG. 3B is a partially enlarged plan view showing a detection purpose vibration unit of the sensor according to the first embodiment.

FIG. 3A is an enlarged plan view for indicating a through hole 20a formed in a drive-purpose vibration unit 20 shown in FIG. 1, and FIG. 3B is an enlarged plan view for showing a through hole 30a formed in a detection-purpose vibration unit 30 shown in FIG. 1.

This angular rate sensor 100 is manufactured by processing a semiconductor substrate 1 made of a silicon substrate, or the like.

A structural body is segmented and formed in the semiconductor substrate 1 by forming trenches in this semiconductor substrate 1 by employing a well-known semiconductor manufacturing technique such as an etching process, as shown in FIG. 1, while the structural body includes a frame-shaped base unit 10 functioning as a fixed portion, and movable units 20, 30, which are located at a frame inner peripheral portion of this base unit 10 and are movable.

As indicated in FIG. 2, the angular rate sensor 100 is formed by employing, an SOI (silicon-on insulator) substrate 1 as the semiconductor substrate 1. This SOI substrate 1 is manufactured by adhering both silicon substrates 1a and 1b to each other via an oxide film 1c.

One silicon substrate 1a (i.e., lower-sided substrate shown in FIG. 2) out of the silicon substrates 1a and 1b of this SOI substrate 1 constructed as a supporting substrate. A well-known micro-machine processing technique such as a trench etching process and a sacrifice layer etching process is carried out from the front plane side of the other silicon substrate 1b with respect to both the silicon substrate 1b (i.e., upper-sided substrate in FIG. 2) and the oxide film 1c.

As a consequence, the trenches are formed in the other silicon substrate 1b, and also, the structural bodies such as the respective units 10, 20, 30 which are segmented by these trenches are formed in the other silicon substrate 1b.

In this case, FIG. 1 represents the front surface side of the other silicon substrate 1b where the structural bodies are formed, namely, the front surfaces side of the semiconductor layer 1b which is supported on the supporting substrate 1a. Also, as indicated in FIG. 1 and FIG. 2, the oxide film 1c is removed by performing a sacrifice layer etching process in an inner peripheral portion of the base unit 10.

As a result, in this inner peripheral portion of the base unit 10, the other silicon substrate 1b where the structural bodies are formed is separated from the above-explained one silicon substrate 1a, namely the supporting substrate 1a.

The other silicon substrate 1b is supported via the oxide film 1c on the one silicon substrate 1a to be fixed thereon in the base unit 10 thereof, and the movable unit 20 is released from the one silicon substrate 1a so as to be movable.

As shown in FIG. 1, the movable units 20 and 30 are equipped with a substantially rectangular-shaped drive-purpose vibration unit 20, a rectangular frame-shaped detection-purpose vibration unit 30, a plurality (namely, 4 pieces in this example) of drive-purpose beam units 21, and a plurality (namely, 2 pieces in this example) of detection-purpose beam units 31. The detection-purpose vibration unit 30 surrounds the drive-purpose vibration unit 20. The plural drive-purpose beam units 21 couple the drive-purpose vibration unit 20 to the detection-purpose vibration unit 30. The plural detection-purpose beam units 31 couple the detection-purpose vibration unit 30 to the base unit 10 of the outer peripheral portion thereof.

The drive-purpose vibration unit 20 is integrally formed with the detection-purpose vibration unit 30 via the drive-purpose beam units 21. More specifically, although the detection-purpose vibration unit 30 and the detection-purpose beam units 31 are interposed, this drive-purpose vibration unit 20 is coupled via the drive-purpose beam units 21 to the detection-purpose vibration unit 30 and the base unit 10, and furthermore, coupled to the one silicon substrate 1a functioning as the supporting substrate.

Each of the plural drive-purpose beam units 21 has a "u-shape" and arranged axisymmetrically each other. One edge portion of each of the drive-purpose beam units 21 is connected to the drive-purpose vibration unit 20, and the other edge portion thereof is connected to a frame inner peripheral plane of the detection-purpose vibration unit 30.

Also, in each of the drive-purpose beam units 21, one pair of parallel rod portions 22 and 23 which are located in parallel to each other in the "u-shape" is flexed along a direction perpendicular to the longitudinal direction thereof. As a consequence, the drive-purpose vibration unit 20 can be vibrated along an arrow "X" direction shown in FIG. 1. This arrow "X" direction will be referred to as a "first direction X" hereinafter along which the drive-purpose vibration unit 20 is vibrated.

On the other hand, in each of the detection-purpose beam units 31, one pair of beams 32 and 33 is arranged in parallel to each other, and both edge portions of these beams are coupled to each other so as to form a rectangular-shaped frame.

Then, the intermediate portion of one beam 32 is connected to a projection portion which is projected from the frame inner peripheral plane in the base unit 10 so as to be fixed/supported by the base unit 10, and the intermediate portion of the other beam 33 is connected to the detection-purpose vibration unit 30.

In other words, the detection-purpose vibration unit 30 is connected via the detection-purpose beam units 31 to the base unit 10, and further, to the silicon substrate 1a functioning as the supporting substrate.

Also, in each of the detection-purpose beam units 31, one pair of the beams 32 and 33 which are located in parallel to each other are flexed along a direction perpendicular to the longitudinal direction thereof. As a consequence, each of the detection-purpose vibration units 30 can be vibrated along a direction perpendicular to the above-described first direction X, namely, an arrow "Y" direction of FIG. 1, while this first direction x corresponds to the vibration direction of the drive-purpose vibration unit 20 within the plane of the semiconductor substrate 1. This arrow "Y" direction will be referred to as a "second direction Y" hereinafter along which the detection-purpose vibration unit 30 is vibrated.

Also, a comb tooth-shaped projection unit 35 is formed on the outer peripheral portion of the detection-purpose vibration unit 30, while the comb tooth-shaped projection unit 35 is projected toward the inner peripheral portion of the base unit 10 which is located opposite to this outer peripheral portion. Also, another comb tooth-shaped projection unit 11 is formed on the outer peripheral portion of the detection-purpose vibration unit 30, while this comb tooth-shaped projection unit 11 is projected from the inner peripheral portion of this base unit 10 in such a manner that this projection unit 11 is meshed with the projection unit 35. The projection units as detecting electrode units 11 and 35 of this angular rate sensor 100 are constituted by both the projection units 11 and 35.

Although these detecting electrode units 11 and 35, and these movable units 20 and 30 are coupled to the base unit 10, respectively, the detecting electrode units 11 and 35 are electrically independently provided with respect to the movable units 20 and 30 since trenches (not shown) are formed in the base unit 10.

Thus, in this angular rate sensor 100, by etching the other silicon substrate 1b functioning as the semiconductor layer and supported by the one silicon substrate 1a functioning as the supporting substrate, the movable units 20 and 30 released from the one silicon substrate 1a is formed. These movable units 20 and 30 are arranged by both the drive-purpose vibration unit 20 and the detection-purpose vibration unit 30.

The detection-purpose vibration unit 30 is coupled from the base unit 10 via the detection-purpose beam units 31 which can be displaced along the second direction Y to one silicon substrate 1a. The drive-purpose vibration unit 20 is coupled via the drive-purpose beam units 21 which can be displaced along the first direction x to the detection-purpose vibration unit 30.

In the angular rate sensor 100, a plurality of through holes 20a and 30a are formed in the movable units 20 and 30, namely in the drive-purpose vibration unit 20 and the detection-purpose vibration unit 30. These plural through holes 20a and 30a penetrate through the semiconductor layer 1b along the thickness direction thereof.

In this angular rate sensor 100, no through hole is formed in the respective beam units 21, 31, and the respective comb tooth-shaped units 11, 35, which own relatively small areas as etching-remaining portions. The through holes are formed in such portions that own relatively large areas and correspond to the portions other than the etching-remaining portions in the inner peripheral portion of the base unit 10, namely the through holes 20a and 30a are formed in the drive-purpose vibration unit 20 and the detection-purpose vibration unit 30.

The angular rate sensor 100 can be manufactured as follows: that is, while one silicon substrate 1a in the SOI substrate 1 is employed as the supporting substrate, the structural bodies such as the movable units 20 and 30 are formed on the other silicon substrate 1b by performing either the trench etching process or the sacrifice layer etching process from the front surface side of the other silicon substrate 1b, and further, the oxide film 1c is removed so as to release the movable units 20 and 30.

As a consequence, in order to improve efficiency of the etching process and to reduce in weight of the angular rate sensor 100 as such a surface processed type of semiconductor device, a plurality of through holes 20a and 30a are formed in the large area portion of the etching remaining portion such as the movable units 20 and 30.

Each of the through holes 20a formed in the drive-purpose vibration unit 20 constitutes a narrow hole shape which is elongated along the first direction X, and each of the through holes 30a formed in the detection-purpose vibration unit 30 constitutes a narrow hole shape which is elongated along the second direction Y.

In this example, the respective through holes 20a and 30a own the rectangular shapes in both the drive and detection-purpose vibration units 20 and 30. In other words, the shapes of the through holes 20a and 30a along the longitudinal direction, namely the long edges of the rectangular shapes may own such shapes that fit to the movable directions X and Y of both the drive and detection-purpose vibration units 20 and 30, respectively.

Next, a description is made of operations as to the angular rate sensor 100 equipped with the above-explained structures. Firstly, although not shown in the drawings, the drive-purpose vibration unit 20 is vibrated (driving vibration) along the first direction X shown in FIG. 1 by way of an electromagnetic driving, a capacitive driving, or the like.

As indicated in FIG. 1, when an angular velocity "Ω" is applied to the angular rate sensor 100 around an axis along the vertical direction as viewed on a plane of this paper, namely around such an axis that is perpendicular to both the first direction X and the second direction Y, Coriolis force is generated along the second direction Y with respect to the drive-purpose vibration unit 20.

This Coriolis force is transferred from the drive-purpose beam units 21 to the detection-purpose vibration unit 30, so that both the detection-purpose vibration unit 30 and the drive-purpose vibration unit 20 are vibrated in an integral manner along the second direction Y shown in FIG. 1 (namely, detecting vibration). Then, in response to this detecting vibration, the distance between both the projection portions 11 and 35 is changed. This distance change is detected as a capacitance change between both the projection portions 11 and 35 via a wiring line unit (not shown) formed on the base unit 10, so that the angular velocity "Ω" can be detected.

On the other hand, the angular rate sensor 100 having the below-mentioned feature points may be provided. That is, in this angular rate sensor 100, by etching the other silicon substrate 1b functioning as the semiconductor layer and supported by the one silicon substrate 1a functioning as the supporting substrate, the movable units 20 and 30 released from the one silicon substrate 1a are formed. These movable units 20 and 30 are arranged by both the drive-purpose vibration unit 20 and the detection-purpose vibration unit 30. The drive-purpose vibration unit 20 is vibrated along the first direction X. The detection-purpose vibration unit 30 is vibrated along the second direction Y perpendicular to the first direction X, to which the angular velocity is applied when the drive-purpose vibration unit 20 is vibrated along the first direction X.

This angular rate sensor 100 is featured in that while the plural through holes 20a penetrated along the thickness direction of the other silicon substrate 1b are formed in both the drive-purpose vibration unit 20 and the detection-purpose vibration unit 30, each of the through holes 20a formed in the drive-purpose vibration unit 20 has a narrow hole shape which is extended along the first direction X, whereas each of the through holes 30a formed in the detection-purpose vibration unit 30 has a narrow hole shape which is extended along the second direction Y.

As a consequence, the through holes 20a and 30a have the narrow hole shapes along the directions X and Y along which the drive-purpose vibration unit 20 and the detection-purpose vibration unit 30 should be vibrated, so that air resistances produced in the vibrations along the first and second directions X and Y along which both the vibration units 20 and 30 should be vibrated can be lowered.

As a result, in the angular rate sensor 100 in which the movable units 20 and 30 released from the supporting substrate 1a are formed by etching the semiconductor layer 1b supported by the supporting substrate 1a, and the plural through holes 20a and 30a are formed in the movable units 20 and 30, damping in the respective vibrations as to the drive-purpose vibration unit 20 and the detection-purpose vibration unit 30 can be suppressed, and thus, the vibrations can be stabilized.

Since the damping is lowered along the respective directions as to both the drive vibration and the detection vibration, stable drive vibrating conditions can be obtained even in such a low-cost sealed package without employing a high-cost vacuum package. Also, this Coriolis force can be converted into the displacement of the detection-purpose vibration unit 30 without losing the energy, so that the angular rate sensor having high sensitivity can be achieved.

In this case, the detection-purpose vibration unit 30 is coupled via the detection-purpose beam units 31 which are displaceable along the second direction Y to the one silicon substrate 1a functioning as the supporting substrate, whereas the drive-purpose vibration unit 20 is coupled via the drive-purpose beam units 21 which are displaceable along the first direction x to the detection-purpose vibration unit 30.

When the drive-purpose vibration unit 20 is driven and vibrated, namely, is vibrated along the first direction X, the detection-purpose vibration unit 30 is not substantially vibrated due to the detection-purpose beam units 31.

Thus, when the drive-purpose vibration unit 20 is driven and vibrated, the drive-purpose vibration unit 20 can be substantially solely driven and vibrated without employing the detection-purpose vibration unit 30. This driving/vibrating operation is desirable in order to realize the stable driving/vibrating operation in the angular rate sensor 100.

It should also be noted that the shapes of the plural through holes which are formed in both the drive-purpose vibration unit 20 and the detection-purpose vibration unit 30 are not limited only to the rectangular shapes, but may be narrow hole shapes. For instance, such hole shapes that are slightly resembled to elliptical shapes may be alternatively employed.

Also, the detection-purpose vibration unit 30 is coupled via the detection-purpose beam units 31 which are displaceable along the second direction Y to the supporting substrate 1a, whereas the drive-purpose vibration unit 20 is coupled via the drive-purpose beam units 21 which are displaceable along the first direction X to the detection-purpose vibration unit 30. Alternatively, a drive-purpose vibration unit may be coupled via drive-purpose beam units which are displaceable along the first direction X to the supporting substrate 1a, and a detection-purpose vibration unit may be coupled via detection-purpose beam units which are displaceable along the second direction Y to the drive-purpose vibration unit.

Also, the above-described angular rate sensor 100 is of a front surface processed type sensor in which the structural bodies in this sensor 100 are formed by processing the front surface of the other silicon substrate 1b, functioning as the semiconductor substrate, of the SOI substrate 1. Alternatively, the present invention may be applied to such a rear surface processed type sensor in which a movable unit is released by providing an opening unit on the supporting substrate 1a side.

Thus, the present invention is featured by such a sensor that the movable unit released from the supporting substrate is formed by etching the semiconductor layer supported by the supporting substrate, and in particular, the plural through holes are formed in the movable units. Since the through holes are made in the narrow hole shapes in the directions along which the drive-purpose vibration unit and the detection-purpose vibration unit should be vibrated, the air resistances produced in the vibrations along these directions are intended to be reduced. Other structural portions of the sensor may be properly changed in view of designs.

Second Embodiment

Figure 5:
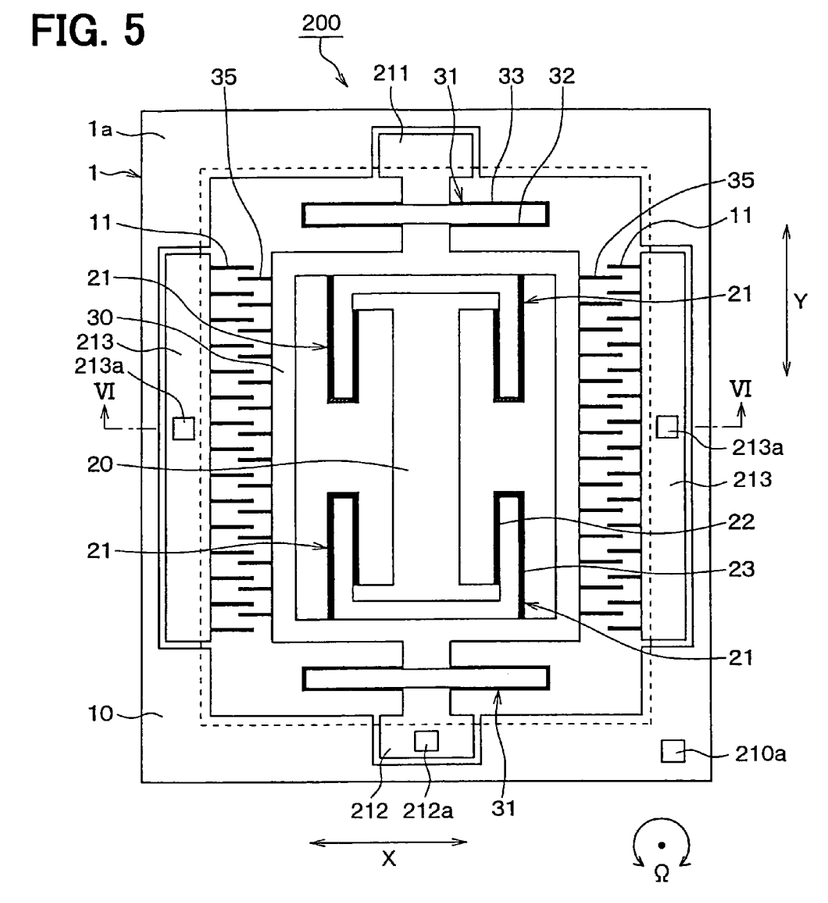
FIG. 5 is a plan view showing an angular rate sensor according to a second embodiment of the present invention.
Figure 6:
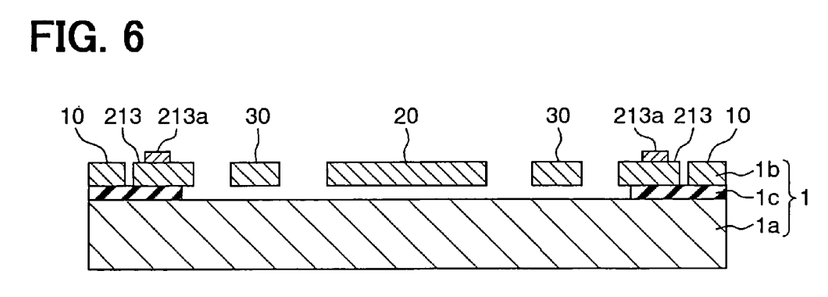
FIG. 6 is a cross sectional view showing the sensor taken along line VI-VI in FIG. 5.

FIG. 5 is a diagram for schematically representing a plane structure of an angular rate sensor 200 as a mechanical quantity sensor according to a second embodiment mode of the present invention. FIG. 6 is a sectional view for schematically showing the angular rate sensor 200, taken along a dot and dash line VI-VI shown in FIG. 5.

This angular rate sensor 200 is manufactured by processing the semiconductor substrate 1 made of a silicon substrate, or the like.

The structural bodies are segmented to be formed in the semiconductor substrate 1 by forming trenches in this semiconductor substrate 1 by employing a well-known semiconductor manufacturing technique such as an etching process, as shown in FIG. 5, while the structural bodies are constituted by the base unit as a frame-shaped peripheral fixing unit 10 functioning as a fixed portion; anchor units 211 and 212; a detecting electrode-purpose fixing unit 213; and further, movable units 20 and 30, etc. The anchor units 211, 212, and the detecting electrode-purpose fixing unit 213 functioning as fixed portions are located at an inner peripheral portion of the peripheral fixing unit 10. Furthermore, the movable units 20 and 30 are located at the inner peripheral portion of the peripheral fixing unit 10, and can be moved.

In this case, in FIG. 5, the front surface side of the other silicon substrate 1b where the structural bodies are formed is represented, namely, the front surfaces side of the semiconductor layer 1b which is supported on the supporting substrate 1a is illustrated. Also, as indicated in FIG. 5 and FIG. 6, the oxide film 1c is removed by a sacrifice layer etching process or the like in the inner peripheral portions of the peripheral fixing unit 10, the anchor units 211, 212, and the detecting electrode-purpose fixing unit 213.

Accordingly, within the inner peripheral portions of this peripheral fixing unit 10, the anchor units 211, 212, and the detecting electrode-purpose fixing unit 213, the other silicon substrate 1b where the structural bodies are formed is separated from the one silicon substrate 1a, namely separated from the supporting substrate 1a.

The peripheral fixing unit 10, the anchor units 211, 212, and the detecting electrode-purpose fixing unit 213 of the other silicon substrate 1b are supported via the oxide film 1c on the one silicon substrate 1a to be fixed thereon in the base unit 10 thereof, and the movable units 20 and 30 are released from the one silicon substrate 1a so as to be movable.

The drive-purpose vibration unit 20 is integrally formed with the detection-purpose vibration unit 30 via the drive-purpose beam units 21. More specifically, although the detection-purpose vibration unit 30 and the detection-purpose beam units 31 being interposed, the drive-purpose vibration unit 20 is coupled via the anchor units 211 and 212 to the one silicon substrate 1a functioning as the supporting substrate.

Then, the intermediate portion of one beam 32 is connected to a projection portion which is projected from inner peripheral planes in the anchor units 211 and 212 so as to be fixed/supported by the anchor units 211 and 212, and another intermediate portion of the other beam 33 is connected to the detection-purpose vibration unit 30.

In this manner, the detection-purpose vibration unit 30 is connected via the detection-purpose beam units 31 to the anchor units 211 and 212, and further to the one silicon substrate 1a functioning as the supporting substrate. In other words, both the vibration units 20 and 30 functioning as the movable units are coupled to the one silicon substrate 1a so as to be supported via the oxide film 1c through the anchor units 211 and 212.

Also, the comb tooth-shaped projection unit 35 is formed on the outer peripheral portion of the detection-purpose vibration unit 30, projecting toward the inner peripheral portion of the detecting electrode-purpose fixing unit 213 which is located opposite to this outer peripheral portion. Also, the other comb tooth-shaped projection unit 11 is formed on the outer peripheral portion of the detection-purpose vibration unit 30, while this comb tooth-shaped projection unit 11 is projected from the inner peripheral portion of this detecting electrode-purpose fixing unit 213 in such a manner that this projection unit 11 is meshed with the projection unit 35. The detecting electrode units 11 and 35 of this angular rate sensor 200 are constituted by both the projection units 11 and 35.

The angular rate sensor 200 of this embodiment mode has a basic structure comprising: one silicon substrate 1a functioning as the supporting substrate; movable units 20 and 30 which are supported by the one silicon substrate 1a under such a state that these movable units 20 and 30 are arranged on the one silicon substrate 1a with a space therebetween; and the peripheral fixing unit 10 which is arranged around the movable units 20 and 30 on the one silicon substrate 1a, and is fixed on this one silicon substrate 1a so as to be supported.

Then, the movable units 20 and 30 which are constituted by the drive-purpose vibration unit 20 and the detection-purpose vibration unit 30 can be displaced along the horizontal direction X-Y with respect to the substrate plane of the one silicon substrate 1a when an angular velocity "Ω" corresponding to a mechanical quantity is applied thereto.

In this case, as shown in FIG. 5, a movable unit-purpose pad 212a is formed on one anchor unit 212 in order that this movable unit-purpose pad 212a is used to apply a potential from an external circuit (not shown) with respect to the movable units 20 and 30. Also, a detecting electrode-purpose pad 213a is formed on the detection electrode-purpose fixing unit 213 in order that this detecting electrode-purpose pad 213a derives signals from the detecting electrode units 11 and 35 to the above-explained external circuit.

Furthermore, as represented in FIG. 5, a peripheral fixing unit-purpose pad 210a is formed at a predetermined position of the peripheral fixing unit 10 in order that the peripheral fixing unit-purpose pad 210a is used to apply a potential from the external circuit to the peripheral fixing unit 10. These pads 210a, 212a, 213a are manufactured by forming films of aluminum, or the like, and are designed to be connected to the external circuit by way of bonding wires, or the like.

Next, a description is made about the operation of the angular rate sensor 200 equipped with the structures. Firstly, the drive-purpose vibration unit 20 is vibrated (driving vibration) along the first direction X shown in FIG. 5 by way of a capacitive driving manner, although not shown in the drawings. In this embodiment mode, a driving electrode (not shown) is provided opposite to the drive-purpose vibration unit 20 in the vicinity of this drive-purpose vibration unit 20.

Then, a constant potential (for example, 16 V) is applied via the movable unit-purpose pad 212a from the external circuit to both the drive-purpose vibration unit 20 and the detection-purpose vibration unit 30, namely the movable units 20 and 30. Also, an AC voltage (for example, 8±5 V) is applied to the driving electrode. The drive-purpose vibration unit 20 is vibrated along the first direction X to be displaced due to the effect of the drive-purpose beam units 21 utilizing electrostatic attracting force produced by this AC voltage.

As indicated in FIG. 5, when an angular velocity "Ω" is applied to the angular rate sensor 200 around an axis along the vertical direction as viewed on a plane of this paper, namely around such an axis which is intersected perpendicular to both the first direction X and the second direction Y, Coriolis force is generated along the second direction Y with respect to the drive-purpose vibration unit 20.

This generated Coriolis force is transferred from the drive-purpose beam units 21 to the detection-purpose vibration unit 30, so that both the detection-purpose vibration unit 30 and the drive-purpose vibration unit 20 are vibrated (detecting vibration) in an integral manner along the second direction Y shown in FIG. 5. Then, in response to this detecting vibration, the distance between the projection portions 11 and 35 is changed. This distance change is detected as a capacitance change between the projection portions 11 and 35 via a wiring line unit (not shown) formed on the base unit 10.

A voltage (for example, 2.5 V) lower than the voltage applied to the movable units 20 and 30 is applied from the outer circuit via the detecting electrode pad 213a to the comb tooth-shaped projection unit 11 on the side of the detecting electrode-purpose fixing unit 213 among the detecting electrode units 11 and 35.

Then, a change in differential capacitances between the left-sided detecting electrode units 11, 35 and the right-sided detecting electrode units 11, 35 indicated in FIG. 5 is detected by the above-explained external circuit. In this embodiment mode, the angular velocity "Ω" is detected in accordance with the above manner.

Further, when the angular rate sensor 200 is operated so as to detect such an angular velocity, a potential is applied from the external circuit via the peripheral fixing unit-purpose pad 210a to the peripheral fixing unit 10, and this potential becomes the maximum potential among the potentials applied to the respective units of the sensor 200. For instance, when the potential at the movable units 20 and 30 is equal to 16 V, a potential applied to the peripheral fixing unit 10 is approximately 20 V.

Therefore, the novel embodiments described above provide an angular rate sensor 200 comprising: one silicon substrate 1a functioning as the supporting substrate; and the movable units 20 and 30 which are supported by the one silicon substrate 1a under such a state that these movable units 20 and 30 are arranged on the above-explained one silicon substrate 1a with a space therebetween. The movable units 20 and 30 are displaceable along the horizontal direction X-Y with respect to the substrate plane of the one silicon substrate 1a when the angular velocity is applied thereto.

The angular rate sensor 200 further comprises the peripheral fixing unit 10 which is arranged around the movable units 20 and 30 on the one silicon substrate 1a, and is fixed on this one silicon substrate 1a so as to be supported thereby. The applied angular velocity is detected based upon the displacement statuses of the movable units 20 and 30 when this angular velocity is applied. In the sensor 200, the potential of the peripheral fixing unit 10 becomes the maximum potential among the potentials applied to the respective structural units of this sensor 200 during the sensor operation.

Since the potential of the peripheral fixing unit 10 is selected to be the maximum potential among the potentials applied to the respective structural units of the angular rate sensor 200 when this sensor 200 is operated, this highest potential is applied from the peripheral fixing unit 10 to the one silicon substrate 1a.

As a result, the potential of the one silicon substrate 1a can be made higher than the conventional GND condition, so that the potential difference between the movable units 20, 30, and the one silicon substrate 1a can be made small.

In the conventional angular rate sensor, in such a case that the potential at the movable units 20 and 30 corresponds to, for example, 16 V when the conventional sensor is operated, the potential difference between the movable units 20, 30, and the one silicon substrate 1a under the GND condition is substantially equal to 16 V.

In contrast to the conventional sensor, in the angular rate sensor of this embodiment mode, the potential of the movable units 20 and 30 corresponds to 16 V during the sensor operation, and the potential of the peripheral fixing unit 10 corresponds to 20 V.

Although the peripheral fixing unit 10 is fixed via the oxide film 1c as the insulating layer to the one silicon substrate 1a so as to be supported by this silicon substrate 1a, since the maximum potential among the potentials applied to the respective structural units of this sensor 200 is applied to the peripheral fixing unit 10, a leak current is produced from the peripheral fixing unit 10 via the oxide film 1c to the one silicon substrate 1a, and thus, the potential of one silicon substrate 1a may become lower than the potential of the peripheral fixing unit 10, for instance, approximately 10 V.

As a consequence, the potential difference between the movable units 20, 30, and the one silicon substrate 1a as the supporting substrate during the sensor operation may become approximately 6 V, namely, may be made lower than that of the conventional sensor. Thus, the electrostatic attracting force between the movable units 20, 30, and the one silicon substrate 1a as the supporting substrate during the sensor operation may be decreased, as compared with that of the conventional sensor.

Therefore, in the angular rate sensor 200 having the movable units 20 and 30 which are supported on the supporting substrate 1a under such a state that these movable units 20 and 30 are supported on the supporting substrate 1a with a space therebetween, the sticking phenomenon between the supporting substrate 1a and the movable units 20 and 30 during the sensor operation can be suppressed as much as possible.

In order to suppress the sticking phenomenon between the supporting substrate 1a and the variable units 20 and 30 during the sensor operation as much as possible, it is simply conceivable that the constant voltage applied to the movable units 20 and 30 is lowered in the angular rate sensor 200.

However, in this conceivable case, the driving force of the movable units 20 and 30 is decreased, so that the amplitudes of the driving vibrations thereof are also decreased, resulting in lowering of the sensitivity of this angular rate sensor 200. To the contrary, in accordance with this embodiment mode, such a problem can be avoided.

Also, since the other silicon substrate 1b is etched which is provided as the semiconductor layer supported by the one silicon substrate 1a, these movable units 20 and 30 are released from this one silicon substrate 1a, and the peripheral fixing unit-purpose pad 10a used to apply a potential to the peripheral fixing unit 10 is provided on the other silicon substrate 1b.

According to the arrangement, since the peripheral fixing unit-purpose pad 10a used to apply the potential to the peripheral fixing unit 10 can be simultaneously manufactured with the formation of the other pads 212a and 213a in an easy manner, it is preferable.

The constant potential (for example, 16 V) is applied to the movable units 20 and 30, whereas the AC voltage (for example, 8±5 V) is applied to the driving electrode. Alternatively, to the contrary to this example, the AC voltage may be applied to the movable units 20 and 30, whereas the constant potential may be applied to the driving electrode.

Even in such an alternative case, in a case of that the maximum potential is applied to the peripheral fixing unit 10 during the sensor operation, the potential of the one silicon substrate 1a may become a potential lower than the potential of the peripheral fixing unit 10 due to a leak current being produced from the peripheral fixing unit 10 via the oxide film 1c. As a consequence, a potential difference between the movable units 20, 30, and the one silicon substrate 1a may be effectively decreased, as compared with the potential difference in the conventional sensor. Similar to the second embodiment mode, the effect of suppressing the sticking phenomenon may be achieved.

Although the respective structural units formed on the supporting substrate 1a are manufactured by the semiconductor, these structural units may be alternatively manufactured by conductors.

Also, the present invention may be applied not only to the angular rate sensor, but also to such a mechanical quantity sensor as an acceleration sensor for sensing an acceleration velocity as a mechanical quantity.

Thus, a mechanical quantity sensor comprises: a supporting substrate; a movable unit which can be displaced along the horizontal direction with respect to the substrate plane of the supporting substrate when the mechanical quantity is applied thereto, and which is supported by the supporting substrate under such a state that the movable unit is arranged on the supporting substrate with a space therebetween; and a peripheral fixing unit which is arranged around the movable unit and is fixed on the supporting substrate so as to be supported, and which detects the applied mechanical quantity based upon the displacement condition of the movable unit when the mechanical quantity is applied. The mechanical quantity sensor is mainly featured by that the potential of the peripheral fixing unit is selected to become the maximum potential among the potentials applied to the respective structural units of this mechanical quantity sensor. Other structural units of this mechanical quantity sensor may be properly changed in their designs.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. An angular rate sensor comprising:
a support substrate;
a semiconductor layer supported on the support substrate; and
a movable portion disposed in the semiconductor layer, wherein
the movable portion is movably supported on the support substrate,
the movable portion includes a driving vibration portion and a detecting vibration portion,
the driving vibration portion is capable of vibrating in a first direction,
the detecting vibration portion is capable of vibrating in a second direction by angular velocity applied to the sensor,
the second direction is perpendicular to the first direction,
the driving vibration portion includes a plurality of through holes, which penetrate in a thickness direction of the semiconductor layer,
the detecting vibration portion includes a plurality of through holes, which penetrate in the thickness direction of the semiconductor layer,
each through hole of the driving vibration portion has an elongated shape extending in the first direction, and
each through hole of the detecting vibration portion has an elongated shape extending in the second direction.

2. The sensor according to claim 1, wherein
the detecting vibration portion is connected to the support substrate through a detection beam, which is movable in the second direction, and
the driving vibration portion is connected to the detecting vibration portion through a driving beam, which is movable in the first direction.

3. The sensor according to claim 1, wherein
the through holes of the driving vibration portion provide a brick pattern, and
the through holes of the detecting vibration portion provide a brick pattern.

4. The sensor according to claim 3, wherein
the through holes of the driving vibration portion provide a plurality of lines, each of which is alternately aligned, and
the through holes of the detecting vibration portion provide a plurality of lines, each of which is alternately aligned.

5. The sensor according to claim 1, wherein
each through hole of the driving vibration portion has a rectangular shape, a wide side of which is parallel to the first direction, and
each through hole of the detecting vibration portion has a rectangular shape, a wide side of which is parallel to the second direction.

6. A physical quantity sensor comprising:
a support substrate;
a movable portion supported on the support substrate in such a manner that the movable portion is movable in a horizontal direction of the substrate when physical quantity is applied to the sensor;
a periphery frame portion disposed around the movable portion and fixed on the support substrate;
a semiconductor layer supported on the support substrate, wherein,
the movable portion and the periphery frame portion are provided by the semiconductor layer,
the movable portion includes a driving vibration portion and a detecting vibration portion,
the driving vibration portion is capable of vibrating in a first direction,
the detecting vibration portion is capable of vibrating in a second direction by the physical quantity applied to the sensor,
the second direction is perpendicular to the first direction,
the driving vibration portion includes a plurality of through holes, which penetrate in a thickness direction of the semiconductor layer,
the detecting vibration portion includes a plurality of through holes, which penetrate in the thickness direction of the semiconductor layer,
each through hole of the driving vibration portion has an elongated shape extending in the first direction, and
each through hole of the detecting vibration portion has an elongated shape extending in the second direction,
the physical quantity is detected on the basis of a displacement of the movable portion when the physical quantity is applied to the sensor, and
the periphery frame portion has an electric potential higher than an electrical potential of the support substrate and an electrical potential of the movable portion.

7. The sensor according to claim 6, wherein
the periphery frame portion is fixed and supported on the support substrate through an insulation layer.

8. The sensor according to claim 6, wherein
the movable portion is separated from the support substrate,
the periphery frame portion includes a pad for applying electric potential to the periphery frame portion,
the movable portion and the periphery frame portion are provided by a semiconductor layer, and
the pad is disposed on the semiconductor layer.

9. The sensor according to claim 6, wherein
the detecting vibration portion is connected to the support substrate through a detection beam, which is movable in the second direction, and
the driving vibration portion is connected to the detecting vibration portion through a driving beam, which is movable in the first direction.

10. The sensor according to claim 6, wherein
the through holes of the driving vibration portion provide a brick pattern, and
the through holes of the detecting vibration portion provide a brick pattern.

11. The sensor according to claim 10, wherein
the through holes of the driving vibration portion provide a plurality of lines, each of which is alternately aligned, and
the through holes of the detecting vibration portion provide a plurality of lines, each of which is alternately aligned.

12. The sensor according to claim 6, wherein
each through hole of the driving vibration portion has a rectangular shape, a wide side of which is parallel to the first direction, and
each through hole of the detecting vibration portion has a rectangular shape, a wide side of which is parallel to the second direction.

* * * * *